May 29, 1945.　　S. M. BLOOMBERG　　2,377,067
GRIP SELECTOR FOR BOWLERS
Filed Dec. 18, 1943　　2 Sheets-Sheet 2
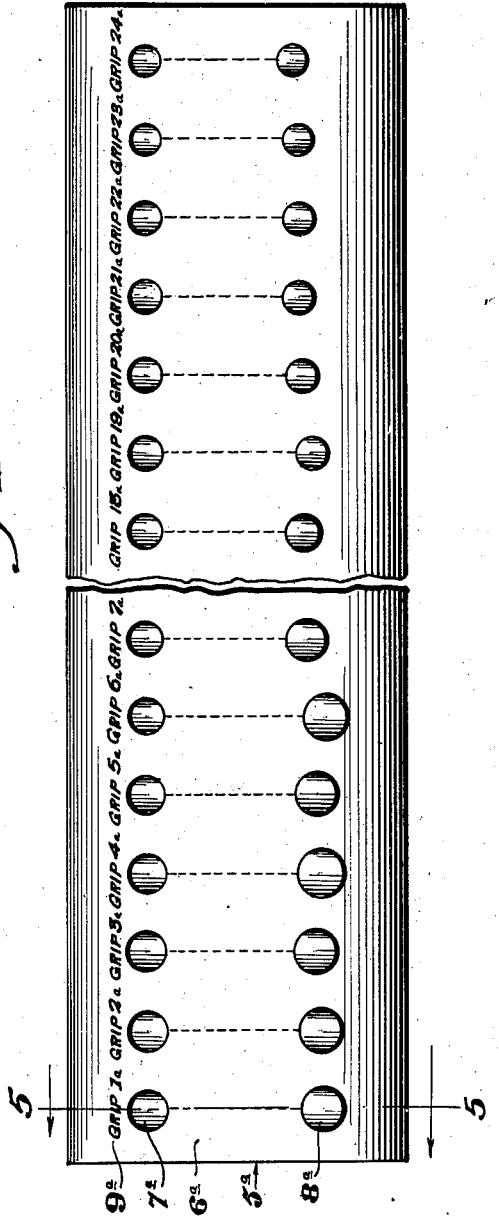
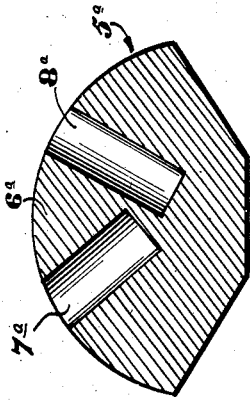
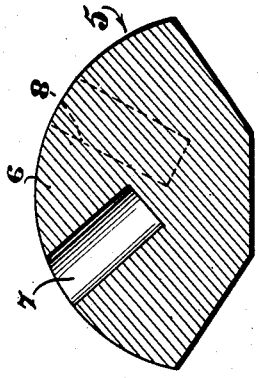
Inventor
SAMUEL MARTIN BLOOMBERG Patented May 29, 1945

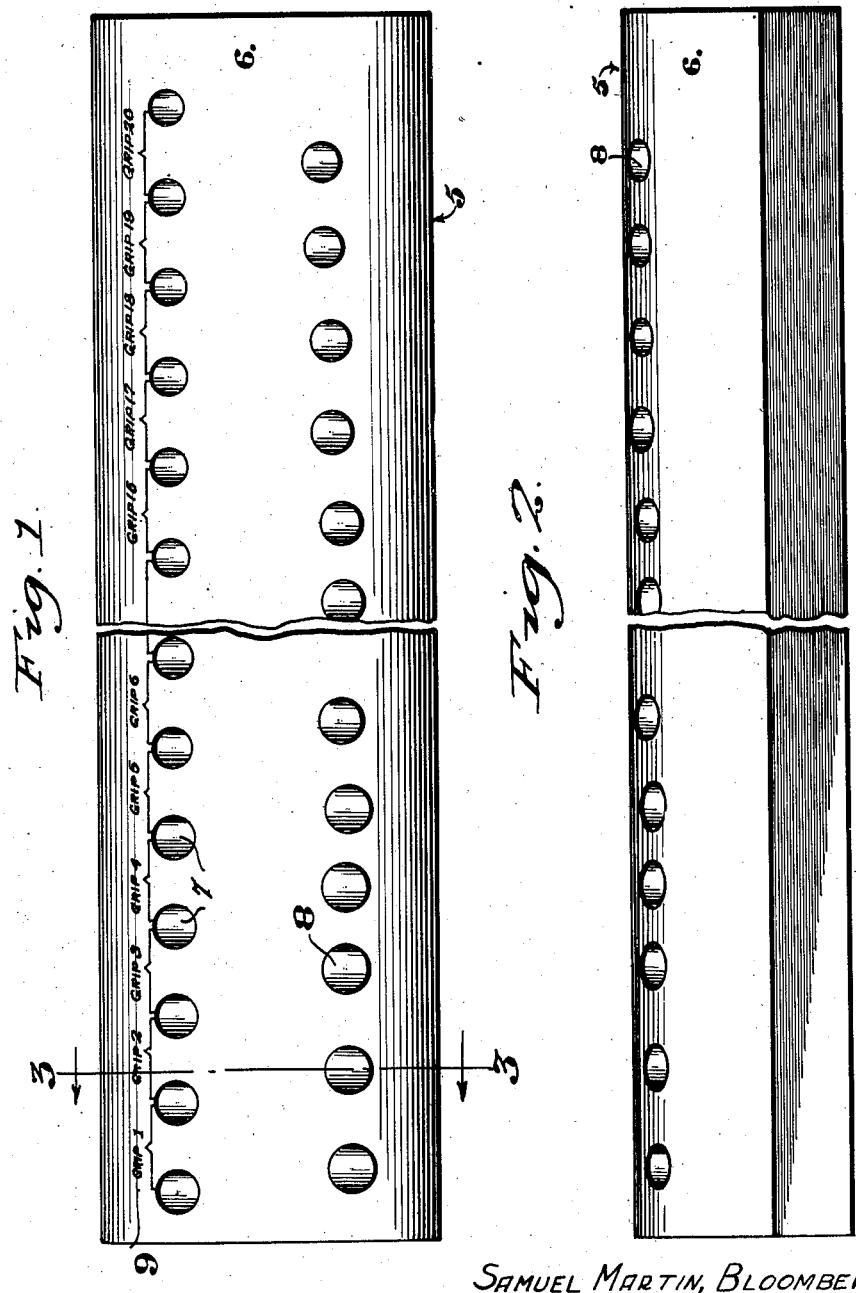

2,377,067

UNITED STATES PATENT OFFICE 2,377,067

GRIP SELECTOR FOR BOWLERS

Samuel M. Bloomberg, Chicago, Ill.

Application December 18, 1943, Serial No. 514,848

5 Claims. (Cl. 33—174)

This invention relates to a device which is aptly termed a grip selector for bowlers, the primary object of the invention being to provide a device to aid bowlers in determining the "grip" or combination of finger and thumb holes, as to relative arrangement, size and spacing, which is best suited to the respective bowlers, thereby enabling the bowlers to select the most desirable balls for their respective use.

Briefly described, the invention contemplates the provision of a segmento-cylindrical or equivalent member having an arcuate face of fixed predetermined radius and having formed therein at said face a row of spaced finger holes and a row of spaced thumb holes, the respective thumb holes being substantially opposed to certain of the finger holes to provide a series of grip combinations, each embodying a thumb hole and at least one finger hole to simultaneously receive the thumb and a finger of a bowler's hand. Means is provided on this member to identify each grip combination and distinguish it from the others, the relative sizes and spacing of the finger and thumb holes of each grip combination differing from those of the other grip combinations. The radius of the arcuate face of said member corresponds to that of the bowling balls which have grip combinations corresponding to those provided on this particular member. Thus, a selector will be provided for bowling balls of one diameter, and a different selector will be provided for bowling balls of a different diameter. Also, selectors will be provided separately for grip combinations involving one thumb hole and one finger hole and grip combinations having one thumb hole and two finger holes, so that the selector used will be that having the desired type of grip combinations.

In the selector for three-point grips, or those embodying one thumb hole and two finger holes for each grip combination, the thumb holes are preferably staggered relative to the finger holes, so that the right finger hole of each grip combination constitutes the left finger hole of the next succeeding grip combination. Further, one row of holes is preferably straight, while the other is uneven to provide for the necessary differences in spacing between the holes of each grip combination and those of other grip combinations.

A preferred embodiment of the invention consists in providing a log-like member in the form of a segment of a cylinder, the arcuate face of which corresponds in curvature or radius to that of the bowling balls having the grip combinations provided in this member. An elongated member provided with a series of grip combinations is thus had which may be conveniently used simultaneously by a number of bowlers in determining the grip combination best suited to their respective use, and consequently in determining the most desirable ball for use.

The present invention is to be particularly distinguished from prior devices used to determine the best size of thumb and finger openings for a particular bowler and the best grip span for such bowler, in which the thumb and a finger of the bowler are not simultaneously engaged in thumb and finger openings of the device whose spacing is suitable for that bowler. Also, the invention is to be further distinguished from prior devices used to determine the proper location of the holes in a bowling ball for a particular purchaser and involving relatively adjustable members respectively provided with the thumb and finger holes.

The exact nature and purpose of the present invention will be clearly understood from the following description when considered in connection with the accompanying drawings.

In the drawings, wherein like reference characters indicate corresponding parts throughout the several views:

Figure 1 is a top plan view of a grip selector embodying the present invention and affording grip combinations, each of which includes a thumb hole and two finger holes.

Figure 2 is an elevational view looking upwardly at Figure 1.

Figure 3 is a transverse section taken on line 3—3 of Figure 1.

Figure 4 is a view similar to Figure 1, showing a modification of the invention, and Figure 5 is a transverse section taken on line 5—5 of Figure 4.

Referring in detail to the drawings, the embodiment shown in Figures 1 to 3, inclusive, consists of an elongated log-like member 5 in the form of a segment of a cylinder whose arcuate face 6 is of a radius corresponding to that of a bowling ball of given diameter. Thus, the face 6 is of fixed predetermined radius, and the member 5 has formed therein at said arcuate face a row of spaced finger holes 7 formed exactly as they are in bowling balls. The row of holes 7 is provided longitudinally of the member 5, and another longitudinal row of spaced thumb holes is also provided in the member 5 at the arcuate face 6 and in the manner conventional with respect to the provision of thumb holes in bowling balls. The respective thumb holes 8 are substantially opposed to certain of the finger holes so as to provide a series of grip combinations, and indicia is provided, as at 9, to identify each grip combination and distinguish it from the others. One row of holes is preferably straight, and the other row is uneven, the straight row preferably being the row of finger holes. Thus, opposed thumb and finger holes of each grip combination are spaced apart the proper distance for that grip combination, so that a bowler may simultaneously engage a thumb and at least one finger simultaneously in a thumb hole and a finger hole of the grip combination suitable for his purpose. The relative sizes and spacings of the finger and thumb holes of the grip combinations vary, and the thumb holes are staggered relative to the finger holes to provide three-point grips, each using two finger holes and one thumb hole. Also, the arrangement is such that the right finger hole of each grip combination constitutes the left finger hole of the next succeeding grip combination, thereby providing for a complete number of grip combinations in a member of minimum length.

The embodiment shown in Figures 4 and 5 is the same as that shown in Figures 1 to 3, inclusive, except that the device is employed for two-point grips or grip combinations, each of which embodies one thumb hole and one finger hole. In this form, the elongated member in the form of a segment of a cylinder is indicated at 5a and it has the arcuate face 6a provided with the rows of finger holes 7a and thumb holes 8a. In this instance, the finger hole of each grip combination is directly opposed to or in transverse alignment with its associated thumb hole 8a, and indicia 9a is provided to identify each grip combination and distinguish it from the others.

In using the invention, the bowlers have only to glance at the device and decide the approximate location of the grip combinations best suitable for them. They then simply place their fingers and thumbs in the combination of holes prearranged, selecting the best combination for their grips and thereby obtaining the key number or grip combination number of the selected proper grip combination. By giving this number or data to the bowling establishment attendant, he can readily furnish the bowler with balls having the proper selected grip combination. The selection is expedited by having the grip combinations progressively arranged so that they embody combinations decreasing in spacing of holes or sizes of holes from one end of the device to the other.

It will thus be seen that I have provided a simple and practical device for carrying out the stated objects of the invention, and it is to be understood that the invention is capable of various changes and modifications, such as fall within the spirit and scope of the invention as claimed.

What I claim as new is:

1. A device to aid a bowler in determining the combination of finger and thumb holes, as to relative arrangement, spacing and size, best suited for his use, comprising an elongated member having a face of arcuate form in cross section and of fixed predetermined radius, said member having formed therein at said face spaced longitudinal rows of finger and thumb holes of predetermined relative arrangement, size and spacing to constitute a plurality of different grip combinations, and means adjacent the holes of one row for identifying each grip combination and distinguishing it from the other grip combinations.

2. A device to aid a bowler in determining the combination of finger and thumb holes, as to relative arrangement, size and spacing, which is best suited to said bowler, comprising an elongated member having an arcuate face of fixed predetermined radius and having formed therein at said face a longitudinal row of spaced finger holes and a longitudinal row of spaced thumb holes, the respective thumb holes being substantially opposed to certain of the finger holes to provide a series of grip combinations, means identifying each grip combination and distinguishing it from the others, the relative sizes and spacing of the finger and thumb holes of each grip combination being such as to simultaneously and correctly receive the thumb and a finger or fingers of the bowler if they provide the proper grip combination for that bowler, said relative sizes and spacing of the finger and thumb holes of each grip combination differing from that of the other grip combinations.

3. A device to aid a bowler in determining the best combination of finger and thumb holes, as to relative arrangement, size and spacing, which is best suited to his use, comprising an elongated member of log-like form and in the nature of at least a segment of a cylinder, said member having an arcuate face of fixed, predetermined radius and having formed therein at said face a longitudinal row of spaced finger holes and a longitudinal row of spaced thumb holes, the respective thumb holes being substantially opposed to certain of the finger holes to provide a series of grip combinations, means identifying each grip combination and distinguishing it from the others, the relative sizes and spacing of the finger and thumb holes of each grip combination differing from that of the other grip combinations, and being such that the holes of each grip combination will simultaneously and correctly receive the thumb and at least one finger of the bowler suited to that combination.

4. A device to aid a bowler in determining the best combination of finger and thumb holes, as to relative arrangement, size and spacing, which is best suited to his use, comprising an elongated member of log-like form and in the nature of at least a segment of a cylinder, said member having an arcuate face of fixed predetermined radius and having formed therein at said face a longitudinal row of spaced finger holes and a longitudinal row of spaced thumb holes, the respective thumb holes being substantially opposed to certain of the finger holes to provide a series of grip combinations, means identifying each grip combination and distinguishing it from the others, the relative sizes and spacing of the finger and thumb holes of each grip combination differing from that of the other grip combinations, and being such that the holes of each grip combination will simultaneously and correctly receive the thumb and two fingers of the bowler suited for that grip combination, there being two finger holes for each thumb holes of each grip combination, and the thumb holes being staggered relative to the finger holes, the finger holes being spaced apart and so related to the thumb holes that the right finger hole of each grip combination constitutes the left finger hole of the next succeeding grip combination.

5. A device to aid a bowler in determining the combination of finger and thumb holes, as to relative arrangement, size and spacing, which is best suited to said bowler; comprising an elongated member having an arcuate face of fixed predetermined radius and having formed therein at said face a longitudinal row of spaced finger holes and a longitudinal row of spaced thumb holes, the respective thumb holes being substantially opposed to certain of the finger holes to provide a series of grip combinations, means identifying each grip combination and distinguishing it from the others, the relative sizes and spacing of the finger and thumb holes of each grip combination being such as to simultaneously receive the thumb and a finger or fingers of the bowler if they provide the proper grip combination for that bowler, said relative sizes and spacing of the finger and thumb holes of each grip combination differing from that of the other grip combinations, the grip combinations progressively decreasing in spacing and sizes of holes from one end of the member to the other end thereof.

SAMUEL M. BLOOMBERG.